US010729119B2

(12) United States Patent
Files et al.

(10) Patent No.: US 10,729,119 B2
(45) Date of Patent: *Aug. 4, 2020

(54) PEST DETECTOR TO IDENTIFY A TYPE OF PEST USING MACHINE LEARNING

(71) Applicants: Jace W. Files, Round Rock, TX (US); John Trevor Morrison, Round Rock, TX (US); Shivshanker Somashekar Naimpally, Austin, TX (US)

(72) Inventors: Jace W. Files, Round Rock, TX (US); John Trevor Morrison, Round Rock, TX (US); Shivshanker Somashekar Naimpally, Austin, TX (US)

(*) Notice: Subject to any disclaimer, the term of this patent is extended or adjusted under 35 U.S.C. 154(b) by 0 days.

This patent is subject to a terminal disclaimer.

(21) Appl. No.: 16/697,893

(22) Filed: Nov. 27, 2019

(65) Prior Publication Data

US 2020/0093116 A1 Mar. 26, 2020

Related U.S. Application Data

(63) Continuation of application No. 16/141,519, filed on Sep. 25, 2018, now Pat. No. 10,524,461.

(51) Int. Cl.
*A01M 1/02* (2006.01)
*G06K 9/00* (2006.01)
*G06F 9/54* (2006.01)
*G01S 13/88* (2006.01)
*G06N 20/00* (2019.01)
*G06F 1/3206* (2019.01)

(52) U.S. Cl.
CPC .......... *A01M 1/026* (2013.01); *G01S 13/888* (2013.01); *G06F 1/3206* (2013.01); *G06F 9/542* (2013.01); *G06K 9/00335* (2013.01); *G06N 20/00* (2019.01)

(58) Field of Classification Search
CPC .... A01M 1/026; G01S 13/888; G06F 1/3206; G06F 9/542; G06N 20/00; G06K 9/00335
USPC ....................................... 340/573.2
See application file for complete search history.

(56) References Cited

U.S. PATENT DOCUMENTS

| 6,445,301 | B1 * | 9/2002 | Farrell | A01M 31/002 |
| | | | | 340/384.2 |
| 10,169,946 | B1 * | 1/2019 | Benkreira | G07F 19/202 |
| 2014/0226860 | A1 * | 8/2014 | Hyde | G06K 9/00362 |
| | | | | 382/103 |
| 2014/0266669 | A1 * | 9/2014 | Fadell | G06N 5/04 |
| | | | | 340/501 |

(Continued)

*Primary Examiner* — Omar Casillashernandez
(74) *Attorney, Agent, or Firm* — Shiv S. Naimpally

(57) ABSTRACT

In some implementations, a detector may include one or more sensors, one or more external indicators, one or more processors, and one or more non-transitory computer readable media storing instructions that are executable by the one or more processors to perform various operations. The operations may include detecting, by a motion sensor, movement associated with the pest and capturing, by a sensor (e.g., an imaging sensor) of the detector, sensor data (e.g., a digital image) of the pest. The operations may include determining, by a machine learning algorithm, that the sensor data indicates a presence of a pest, and sending a notification message to a computing device. The notification message may include at least a portion of the sensor data. The operations may include visually indicating, using a pest indicator of the one or more external indicators, that the pest was detected.

20 Claims, 11 Drawing Sheets

(56) References Cited

U.S. PATENT DOCUMENTS

| | | | |
|---|---|---|---|
| 2018/0130196 A1* | 5/2018 | Loveland | G01C 11/02 |
| 2018/0206476 A1* | 7/2018 | Brown | A01M 19/00 |
| 2018/0249696 A1* | 9/2018 | Daly, Jr. | A01M 23/005 |
| 2019/0246623 A1* | 8/2019 | Tews | A01M 29/00 |

\* cited by examiner

PEST DETECTOR TO IDENTIFY A TYPE OF PEST USING MACHINE LEARNING

CROSS-REFERENCE TO RELATED APPLICATIONS

The present patent application is a continuation of U.S. patent application Ser. No. 16/141,519 filed on Sep. 25, 2018 entitled "PEST DETECTOR TO IDENTIFY A TYPE OF PEST USING MACHINE LEARNING" and is incorporated by reference herein in its entirety and for all purposes as if completely and fully set forth herein.

BACKGROUND OF THE INVENTION

Field of the Invention

The invention relates to artificial intelligence (AI) and more particularly to using machine learning to identify a type of pest.

Description of the Related Art

Pest detection and pest control have remained largely unchanged for many years. Modern pest control is decidedly low-tech, with glue traps or mechanical traps being manually baited with peanut butter or similar attractants. Once traps are set, a user (e.g., either a homeowner or a pest control service) must manually examine each trap to avoid having a trapped pest slowly die and decay over time and to re-bait each trap as needed.

Pest detection is similarly low tech and requires that a homeowner either view the pest directly or view an effect of the pest. Most pests in a house tend to be nocturnal so homeowners rarely view pests directly. For example, an occupant of a home may observe a cockroach when they get up in the middle of the night and turn the lights on in the kitchen to get something to eat and/or drink. As another example, an occupant may view the effect of the pest, e.g., rat droppings, gnaw marks, and the like. Because of this, many types of pests may go undetected for long periods of time.

SUMMARY OF THE INVENTION

In some implementations, a detector may include one or more sensors, one or more external indicators, one or more processors, and one or more non-transitory computer readable media storing instructions that are executable by the one or more processors to perform various operations. The operations may include detecting, by a motion sensor, movement associated with the pest and capturing, by a sensor (e.g., an imaging sensor) of the detector, sensor data (e.g., a digital image) of the pest. The operations may include determining, by a machine learning algorithm, that the sensor data indicates a presence of a pest, and sending a notification message to a computing device. The notification message may include at least a portion of the sensor data. The operations may include visually indicating, using a pest indicator of the one or more external indicators, that the pest was detected.

DETAILED DESCRIPTION

Figure 1:
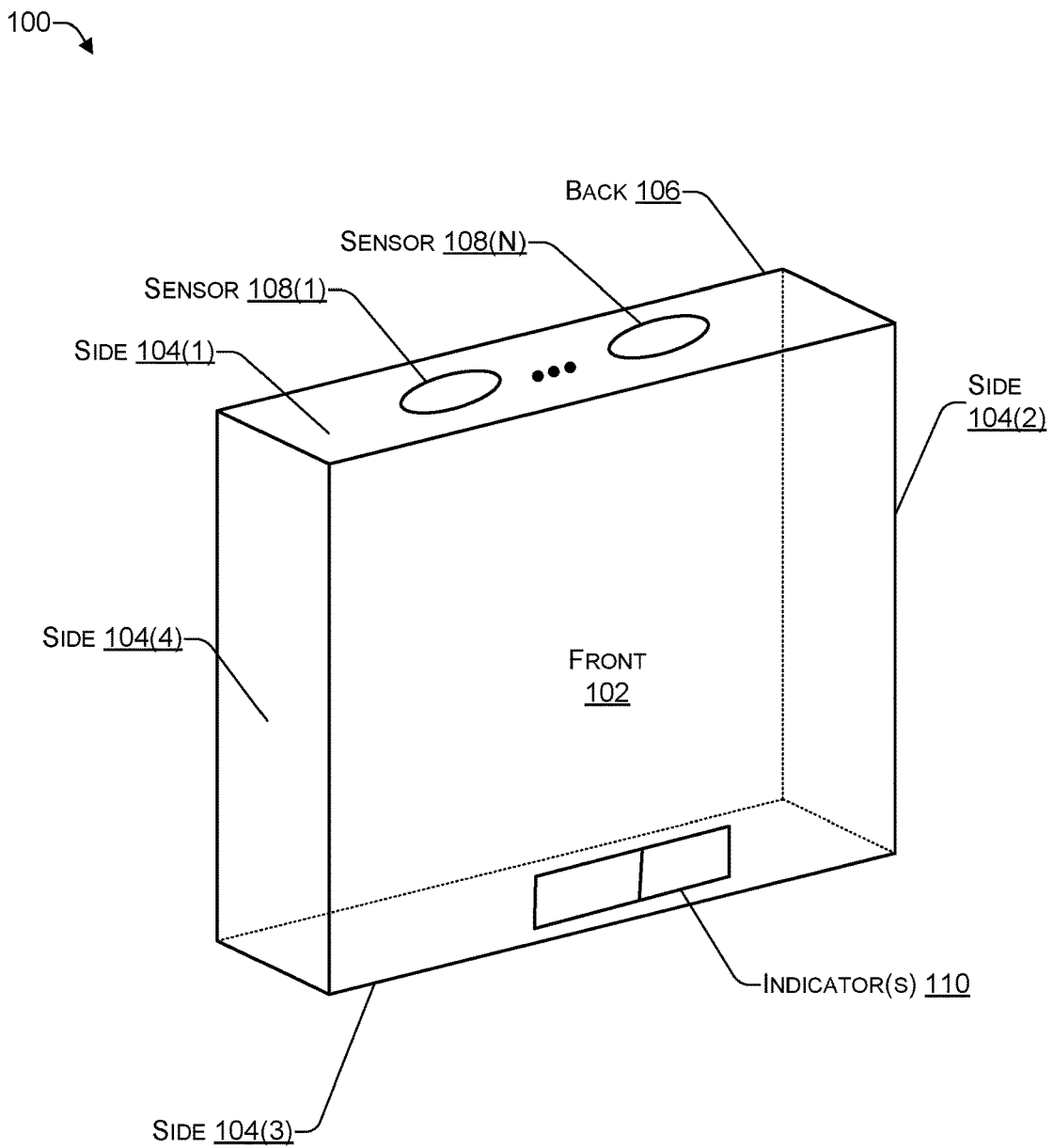
FIG. 1 is a block diagram illustrating a detector, according to some embodiments.

The systems and techniques herein describe a pest detector that can detect and identify pests and send an alert to a computing device associated with a homeowner or a pest control service. The pest detector may include one or more sensors, such as, for example, a motion sensor, an imaging sensor (e.g., a camera), an audio transducer (e.g., microphone), a structured light sensor, an ultrasound sensor, an infrared imaging sensor, a temperature (e.g., a thermistor) sensor, an ultrasonic sensor, a capacitive sensor, a micropower impulse radar sensor, a global positioning satellite (GPS) sensor, an altimeter (e.g., to detect which floor of a building the detector has been placed, based on altitude), mmWave, and the like. Structured light involves projecting a known pattern (e.g., a grid or horizontal bars) of light on to an area (e.g., detection zone). The way in which the light deforms when striking the area enables a vision system (e.g., imaging sensor(s) and software) to determine the depth and surface information associated with a pest in the area. An mmWave sensor is able to detect objects (e.g., pests) and provide a range, a velocity, and an angle of each of the objects. An mmwave sensor operates in the spectrum between 30 GHz and 300 GHz.

The pest detector may have one or more sensors that monitor a particular area (e.g., detection zone) or set of (e.g., one or more) areas. When a sensor (e.g., motion detector, infrared imaging sensor, or the like) detects motion associated with a potential pest in the detection zone, sensor data, such as an image of the potential pest, may be captured. For example, an ambient light sensor (ALS) may detect an amount of light. If the ALS detects that the amount of available light satisfies a light threshold, then an imaging sensor may be used to capture a digital image (or a set of digital images=a video) of the potential pest. If the ALS detects that the amount of available light does not satisfy the light threshold, then either an infrared imaging sensor may be used to capture a digital image of the potential pest or a light emitting diode (LED) may be used as a flash to briefly illuminate the potential pest to enable an imaging sensor to capture a digital image.

The pest detector may use the gathered data (e.g., digital image, movement information, and the like) associated with the potential pest to determine whether the data indicates a pest and if so, identify the pest using a machine learning (ML) algorithm. The ML algorithm may use, for example, a support vector machine or other type of classifier, clustering, Bayesian network, reinforcement learning, representation learning, similarity and metric learning, sparse dictionary learning, rule-based machine learning, or the like. The ML may be trained to recognize multiple types of pests and to ignore data indicative of humans or pets (e.g., dogs and cats). In some cases, the type of pests that the ML can recognize may be based on the geographic region in which the pest detector is placed. For example, the pest detector may determine a location of the pest detector and download data associated with pests found in a region that encompasses the detector's location. To illustrate, a pest detector located in the southwestern United States may download an ML capable of detecting scorpions and snakes that are common to the local region, in addition to detecting ants, cockroaches, mice, rats, and other pests that are common to all geographic areas.

The ALS may be used to transition the detector to and from a low power mode. For example, many pests tend to be active during darkness. In addition, a human being is likely to detect pests that are active when there is at least a threshold amount of light by seeing or hearing the pests or effects of their activity. Thus, the detector may be in a detection mode when the light measured by the ALS satisfies a light threshold (or the presence of a human is detected). The detector may transition from the detection mode to a low power mode when the ALS determines that the light does not satisfy the light threshold (or a presence of a human is not detected for more than a threshold amount of time). When the ALS determines that the light satisfies the threshold (or detects the presence of a human), the detector may transition from the low power mode to the detection mode. For example, if the detector is powered using a battery, then transitioning to the low power mode may conserve battery power and enable the detector to function for a longer time using one or more batteries as compared to if the low power mode was not used. Detectors that draw power from an electrical outlet (e.g., alternating current (A/C)) may, in some cases, not use the low power mode. The low power mode may be a user selectable option such that a user can select to disable low power mode, thereby causing the detector to remain in detection mode.

The detector may be available in different models, such as a battery powered model and an A/C powered model. The detector models may include a weather sealed model (e.g., that uses gaskets) to prevent moisture and particulate matter from entering into a housing of the detector to enable the detector to be used outdoors to detect outdoor pests (e.g., rabbits, squirrels, racoons, snakes, wasps, and the like). The detector models may include a modular model that enables sensor modules to be attached to (and detached from) the housing of the detector. For example, if the detector is approximately cube-shaped, a sensor module that includes one or more sensors may be attached (e.g., plugged into) one or more of the six surfaces of the cube to enable the detector to monitor multiple detection zones. The detector models may include a detector with a back-facing sensor in which, after the detector is plugged into a wall outlet for A/C power or a battery powered unit is attached to the wall, the sensor faces the wall and is able to detect pests (e.g., mice, termites, carpenter ants, and the like) inside the wall. For example, the back-facing sensor may use ultrasonic, capacitive, or micropower impulse radar to detect the shapes and movements of pests within the wall. The back-facing sensor may be built-in to the detector or into an extendable housing to enable the sensor to be positioned over a particular area of the wall (e.g., where pest activity is suspected due to noises or other pest effects). A plug-in module may include bait and two small electrodes to lure and kill (e.g., using electrocution) a small pest, such as a mosquito, a fly, an ant, or small cockroach, or another type of pest. The detector models may include a detector with a swiveling A/C plug to enable a user to position the detection area to be below the detector (e.g., detection zone includes the area where the wall meets the floor), above the detector (e.g., detection zone includes the area where the wall meets the ceiling), or one side of the detector (e.g., detection zone includes a portion of the wall to one side of the detector). In some cases, the detector may be incorporated into an A/C wall outlet that can be installed in a new house or as a replacement in an existing house. Such an implementation may provide one or two A/C receptacles and expose one or more sensors through a cover plate.

Each detector may include one or more external indicator lights to visually indicate a mode (e.g., detection mode or low-power mode), network connectivity (e.g., connected to or disconnected from network), pest detection (e.g., green indicates no pests detected, red indicates a pest was detected), and other information associated with the detector. In some cases, different colored covers may be used to enable the detectors to blend in to a particular décor. For example, a blue cover may be snapped on to a detector for a boy's room and a pink cover may be snapped on to a detector for a girl's room. A corporate logo or a graphic (e.g., associated with Disney®, Star Wars®, Marvel®, or the like) may be embossed or silk-screened on the cover.

Each detector may include a wireless network interface (e.g., WiFi®, Bluetooth®, or the like) to enable the detector to communicate with (i) other detectors, (ii) an application ("app") executing on a user's computing device, (iv) a cloud-based server, (iii) a pest services company, or any combination thereof. For example, the detector may create a mesh network with other detectors using a short distance networking protocol, such as, for example, Bluetooth®, ZigBee, or the like. As another example, the detector may communicate with other detectors, one or more user devices, a server, or other devices using WiFi® or another type of wireless networking technology. The detector may communicate data to an application executing on a user device, such as a smartphone, a tablet, or a virtual assistant enabled device (e.g., Amazon® Echo® or Alexa®, Google® Home, Apple® Homepod, or the like).

An app (created by a manufacturer of the detector) may be downloaded and installed on a user device, such as a computing device associated with an occupant of a home, a warehouse staff member, a pest control service, or the like. The app may display a user interface (UI) to display data received from multiple detectors in a particular location, such as a house, a warehouse, an industrial plant, or another type of building or set of buildings. For example, the UI may display an approximate floor plan of the particular location and an approximate location of each detector within the floor plan. The UI may display data associated with each detector, such as a mode (e.g., detection mode or low-power mode), network connectivity (e.g., connected to or disconnected from a network), whether or not the detector has detected a pest (e.g., green indicates no pests detected, red indicates one or more pests were detected), and other information associated with the detector. The UI may display one or more predictions and/or suggestions made by the ML algorithm. For example, the predictions may include that a particular type of pest appears to nesting in a particular location. To illustrate, the multiple detectors in the location may, after detecting a pest, determine a direction in which the pest is travelling and predict where the pests are nesting (e.g., breeding) based on the direction data. The ML may make suggestions such as "add a detector in this room and on this wall" to provide additional data, "add a detector with a back-facing sensor in this location" to determine (e.g., confirm) whether a pest is nesting behind a particular wall, and the like. The UI may enable a user to view the data gathered by each detector, such as a digital image of the pest captured by the detector. The UI may provide information as to nearby (e.g., within a predetermined radius from a current location of the device on which the app is installed) pest control service providers and enable the user to request a quote for pest control services.

The data gathered by each detector (e.g., pest-related data) may be sent to a server (e.g., a cloud-based server). The server may thus receive data from multiple detectors in each of multiple locations (e.g., houses, warehouses, industrial plants, restaurants, grocery stores, and the like). The server may execute a second ML algorithm to provide additional analysis and prediction. For example, if multiple locations in a particular neighborhood of a city detect a particular pest, the server may proactively provide a suggestion (via the UI of the app) to users located in the particular neighborhood, e.g., "This particular pest has been detected in your neighborhood but has not yet been detected in your location (e.g., house). We recommend taking the following preventative measures to prevent this pest from becoming a problem." In addition, if the detector is unable to identify a particular pest, the detector may send the data (e.g., digital image, audio recording, video recording, movement data, structured light data) associated with the particular pest to the server for further analysis. The server may determine the type of pest that the detector detected and send an update to the detector. For example, if a new pest is detected, the server may send an updated ML algorithm or an updated (or new) pest profile to detectors located in a same region. For example, if a particular region experiences unseasonably warm weather that causes a large number of a particular pest (e.g., locusts, crickets, or the like) to breed and the current version of the ML in the deployed detectors is not capable of detecting the particular pest, then after one or more detectors send pest-related data to the server, the server's ML algorithm may identify the pest, create an updated detector ML algorithm, and send (or provide for download) the updated ML algorithm to detectors in the particular region. Each detector may install the updated ML algorithm to enable each detector to detect the particular pest. In this way, if a new pest becomes prevalent in a particular region, the new pest can be detected by updating the ML algorithm used by each detector.

In some cases, a pest control service provider may rent the detectors to homeowners or commercial users at no charge or a nominal charge in exchange for providing pest control services to the location in which the detectors are deployed. For example, a homeowner may suspect that a particular pest (e.g., rats) are in a particular room (e.g., attic) and contact the pest control service provider who sends a service representative to place multiple detectors in the homeowner's house. The detectors may send data associated with detected pests to the pest control service provider who then presents a list of pests detected and an estimate to treat the house to rid the house of the detected pests. In other cases, a homeowner, landlord, company, or other entity may purchase and deploy the detectors in one or more buildings. When one or more pests are detected, the app may be used to request quotes from multiple pest control service providers.

For example, a pest detector may include one or more sensors, one or more processors, and computer-readable storage media to store instructions executable by the one or more processors to perform various operations. The operations may include receiving sensor data from one or more sensors. The sensor data may include a set of (e.g., one or more) digital images, a digital audio recording, or both. For example, a motion sensor may detect movement associated with a pest and an imaging sensor may capture one or more digital images of the pest. The one or more sensors may include at least one of: a motion sensor, an imaging sensor, a microphone, a structured light sensor, an ultrasound sensor, a temperature sensor, an ultrasonic sensor, a capacitive sensor, or a micropower impulse radar sensor. The operations may include using a machine learning algorithm to determine that the sensor data indicates a presence of a pest, and sending a notification message to a computing device. The machine learning algorithm may determine a type of the pest. For example, the machine learning algorithm may determine whether the pest is a cockroach, a mouse, or a rat. The notification message may include at least a portion of the sensor data (e.g., a digital image of the pest). The operations may include visually indicating, using an external indicator light of the detector, that the pest was detected. The operations may include storing the sensor data in a memory of the detector to create stored data and sending the stored data to a server. The operations may include receiving ambient light data from an ambient light sensor of the detector, determining that the ambient light data satisfies a predetermined threshold, and transitioning the detector from an active mode to a low-power mode. A particular sensor of the one or more sensors may include an ultrasonic sensor, a capacitive sensor, or a micropower impulse radar sensor, e.g., a sensor capable of detecting movement within a wall.

A sensor plugin may include at least one sensor of the one or more sensors and a plug to mate with a receptacle in a housing of the detector. The plug may provide a mechanical linkage and electrical linkage to the detector. For example, the electrical linkage may carry power from the detector to the at least one sensor and carry additional sensor data from the at least one sensor to the one or more processors in the detector. An electrified plugin may include a shallow receptacle in which bait is placed and an electrified mesh to electrocute a particular pest that is attracted by the bait. The sensor plugin may include a telescoping extender that can be extended to position the at least one sensor at a particular location to create a pest detection zone. For example, the at least one sensor may face backward to detect pest movement within a wall.

The operations may include receiving second sensor data from the one or more sensors, determining that the machine learning algorithm does not recognize a second pest in the second sensor data, and sending a message that includes the second sensor data to a server requesting assistance identifying the second pest. In response, the detector may receive an update to the machine learning algorithm from the server, install the update to create an updated machine learning algorithm, and determining, by the updated machine learning algorithm, that the second sensor data indicates the presence of the second pest.

FIG. 1 is a block diagram illustrating a detector 100, according to some embodiments. The detector 100 may be cube-shaped with six surfaces, including a front 102, sides 104(1), 104(2), 104(3), 104(4), and a back 106. Of course, the detector 100 may, in some cases, have another type of geometric shape or non-geometric shape.

One or more sensors 108(1) to 108(N) (where N>0) may be dispersed across one or more of the surfaces 102, 104, or 106. The sensors 108 may, for example, include a motion sensor, an imaging sensor (e.g., a camera), an audio transducer (e.g., microphone), a structured light sensor, an ultrasound sensor, an infrared imaging sensor, a temperature (e.g., a thermistor) sensor, an ambient light sensor (ALS), another type of sensor, or any combination thereof. For example, a motion sensor may detect the presence of a pest and cause (e.g., trigger) an imaging sensor to capture one or more digital images of the pest. To illustrate, the imaging sensor may capture multiple digital images at a particular rate, such as X frames per second (where X>0). The multiple digital images may be used by a machine learning algorithm of the detector 100 to determine (e.g., predict) a direction in which the pest is going. By determining the direction of movement of multiple pests detected by multiple detectors, the detectors may determine (e.g., predict) where the pests are likely nesting (e.g., breeding) or congregating. In some cases, the rate of movement of the pest (or potential pest), e.g., movement between a first image captured at a first point in time and a second image captured at a second point in time, may be used to determine the type of pest.

The detector 100 may include one or more indicators 110. The indicator lights may visually indicate (i) a mode (e.g., detection mode or low-power mode) of the detector 100, (ii) a network connectivity (e.g., connected to or disconnected from network) of the detector 100, (iii) whether a pest was detected (e.g., green indicates no pests detected, red indicates a pest was detected), (iv) whether an update is being installed, (v) other information associated with the detector 100, or any combination thereof.

Figure 2:
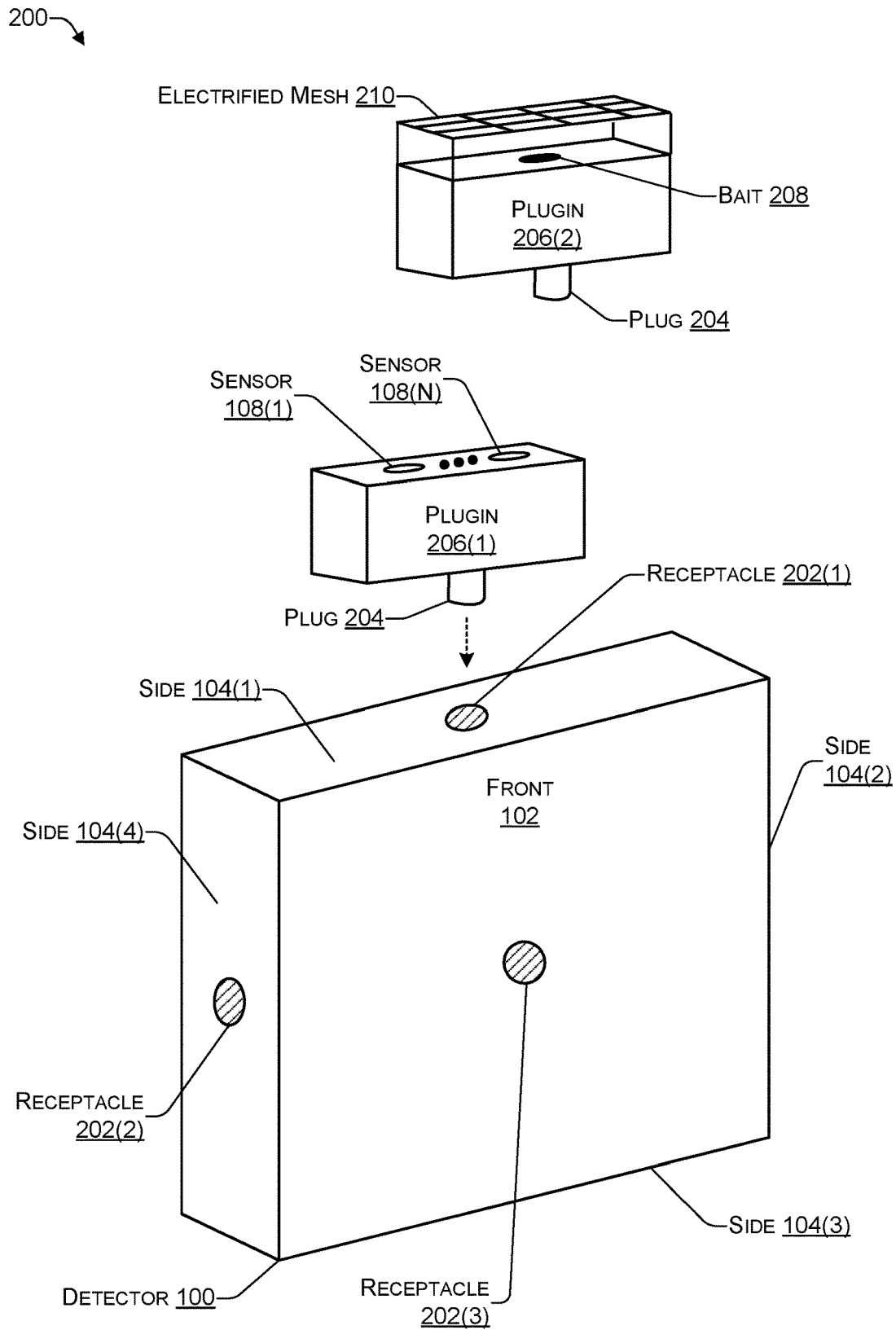
FIG. 2 is a block diagram illustrating connecting a detector capable of accepting modular plugins, according to some embodiments.

FIG. 2 is a block diagram 200 illustrating connecting a detector capable of accepting modular plugins, according to some embodiments. One or more of the surfaces 102, 104, 106 of the detector 100 may include a receptacle 202 to accept a plug 204 of a plugin 206(1). For example, the side 104(1) may include a receptacle 202(1), the side 104(4) may include a receptacle 202(2), and the front 102 may include a receptacle 202(3).

The plugin 206(1) may include one or more of the sensors 108 (e.g., a motion detector sensor and an imaging sensor). In this way, a user can attach various plugins to cover detection zones appropriate for a particular environment. In some cases, one type of plugin with a first set of sensors may be used to detect pests that travel along where the floor meets the wall while another type of plugin with a second set of sensors may be used to detect pests that travel along where the wall meets the ceiling, and the like.

A plugin 206(2) may include bait 208 and an electrified mesh 210. The bait 208 may be a type of pest attractant that is used to lure a pest towards the plugin 206(2). When the pest touches the electrified mesh 210, the pest may be killed (e.g., electrocuted) by supplying power (e.g., voltage and current) to the electrified mesh 210. In some cases, the electrified mesh 210 may be provided power without regard to whether a pest is detected. In other cases, the plugin 206(2) may include a sensor, such as a motion sensor. When the motion sensor detects movement, the detector 100 may supply power to the electrified mesh 210. When the motion sensor no longer detects movement, the detector 100 may stop supplying power to the electrified mesh 210. In some cases, the bait 208 may be used without the electrified mesh 210 to attract pests to come near the detector 100 to enable the detector 100 to gather sensor data from the sensors 108.

The plug 204 may serve two purposes. First, the plug 204 may be used to (temporarily) secure the plugin 206(1), 206(2) to the detector 100. Second, the plug 204 may include electrical contacts to enable the detector 100 to provide power to the sensors 108 in the plugin 206(1) and to the electrified mesh 210 of the plugin 210(2). In some cases, power may also be provided to the bait 208. For example, the pest attractant may be vaporized by applying power to the bait 208.

Figure 3:
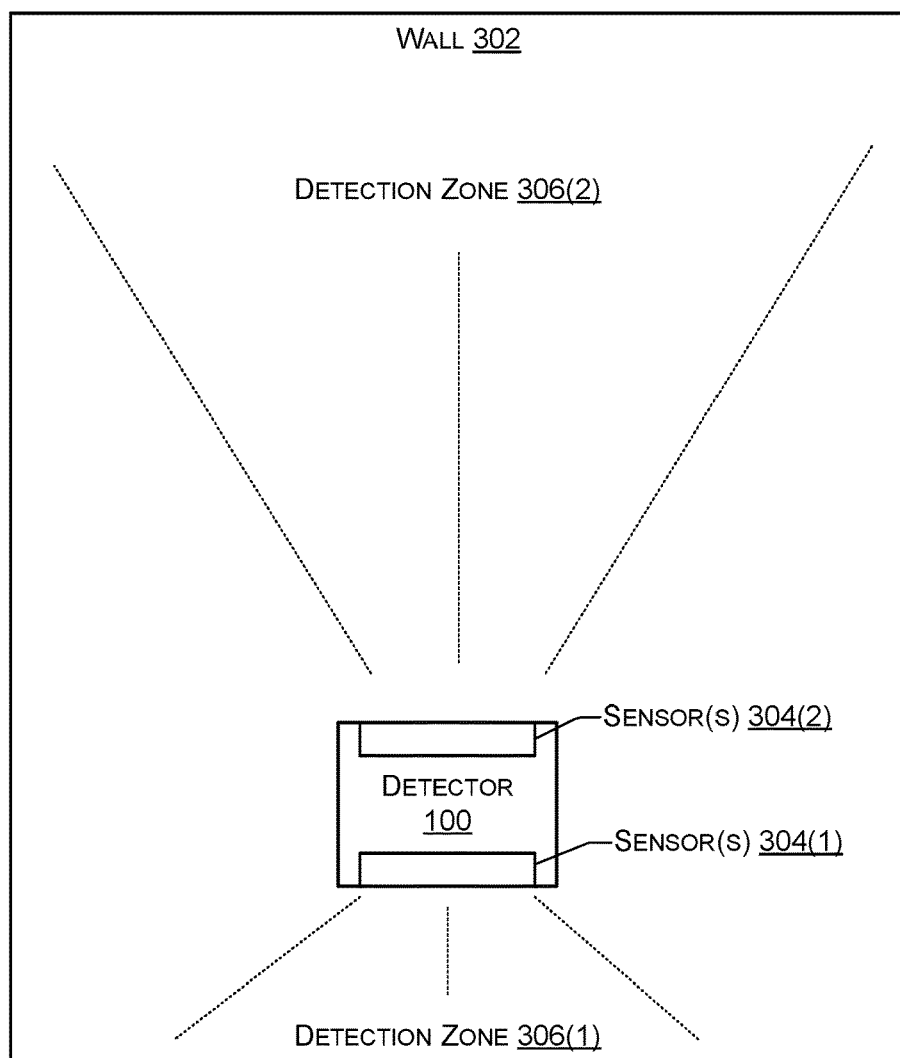
FIG. 3 is a block diagram illustrating detection zones of a detector according to some embodiments.

FIG. 3 is a block diagram 300 illustrating detection zones of a detector according to some embodiments. The detector 100 may be placed on a wall 302 with a first set of (e.g., one or more) sensors 304(1) facing down (e.g., towards where a floor meets the wall 302) and a second set of sensors 304(2) facing up (e.g., towards where the wall 302 meets a ceiling). The set of sensors 304(1) may create a detection zone 306(1) and the set of sensors 304(2) may create a detection zone 306(2).

Figure 4:
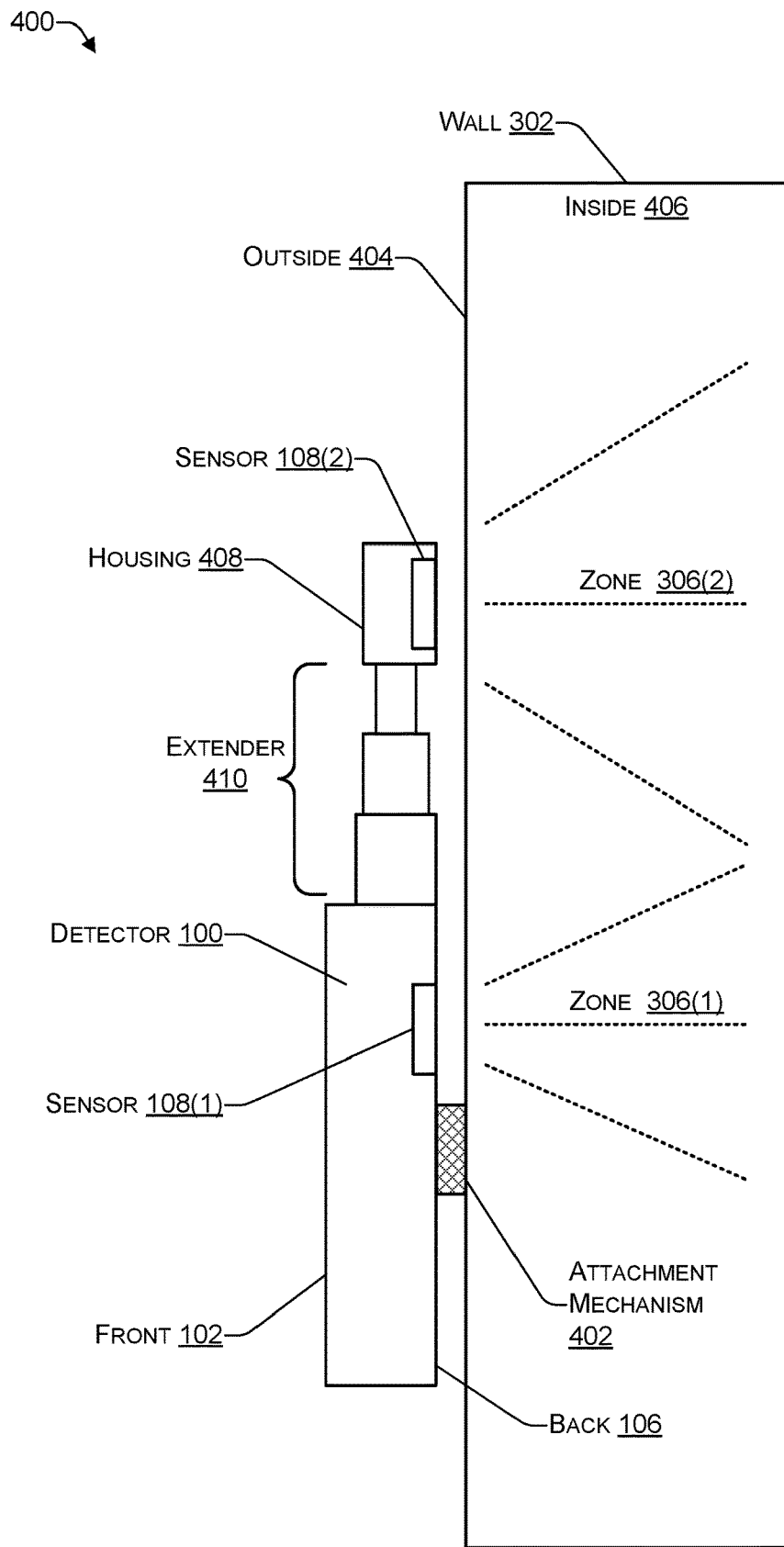
FIG. 4 is a block diagram illustrating a detector to detect movement within a wall, according to some embodiments.

FIG. 4 is a block diagram 400 illustrating a detector to detect movement within a wall, according to some embodiments. The detector 100 may be (temporarily) attached to the wall 302 using an attachment mechanism 402. For example, the attachment mechanism 402 may include plugging electrical prongs protruding from the back 106 of the detector 100 into an electrical outlet on an outside 404 of the wall 302. As another example, the attachment mechanism 402 may use double-sided tape, hook and loop (e.g., Velcro®) strips, or non-damaging glue strips (e.g., 3m® Command®) to attach the back 106 of the detector 100 to the outside 404 of the wall 302. One ore more of the sensors 108, such as the representative sensor 108(1), may face the back 106 of the detector 100 and may be capable of detecting movement of pests on an inside 406 of the wall 302.

In some cases, a housing 408 that includes one or more additional sensors 108, such as the representative sensor 108(2), may be attached to an extender 410. The extender 410 may be a fixed length or may include a variable length (e.g., telescoping) mechanism to enable the sensor 108(2) to be positioned at a particular location on the outside 404 of the wall 302. By positioning the housing 408 appropriately, the sensor 108(2) may detect the movement of pests (e.g., rats, mice, termites, carpenter ants, and the like) on the inside 406 of the wall 302, e.g., the detection zone may include the inside 406 of the wall 302. The extender 410 may be permanently attached to the detector 100 or may be attached to the detector 100 using the mechanism described in FIG. 2. For example, the bottom of the extender 410 may include the plug 204 that can be attached to the receptacle 202(1) in the detector 100.

Figure 5:
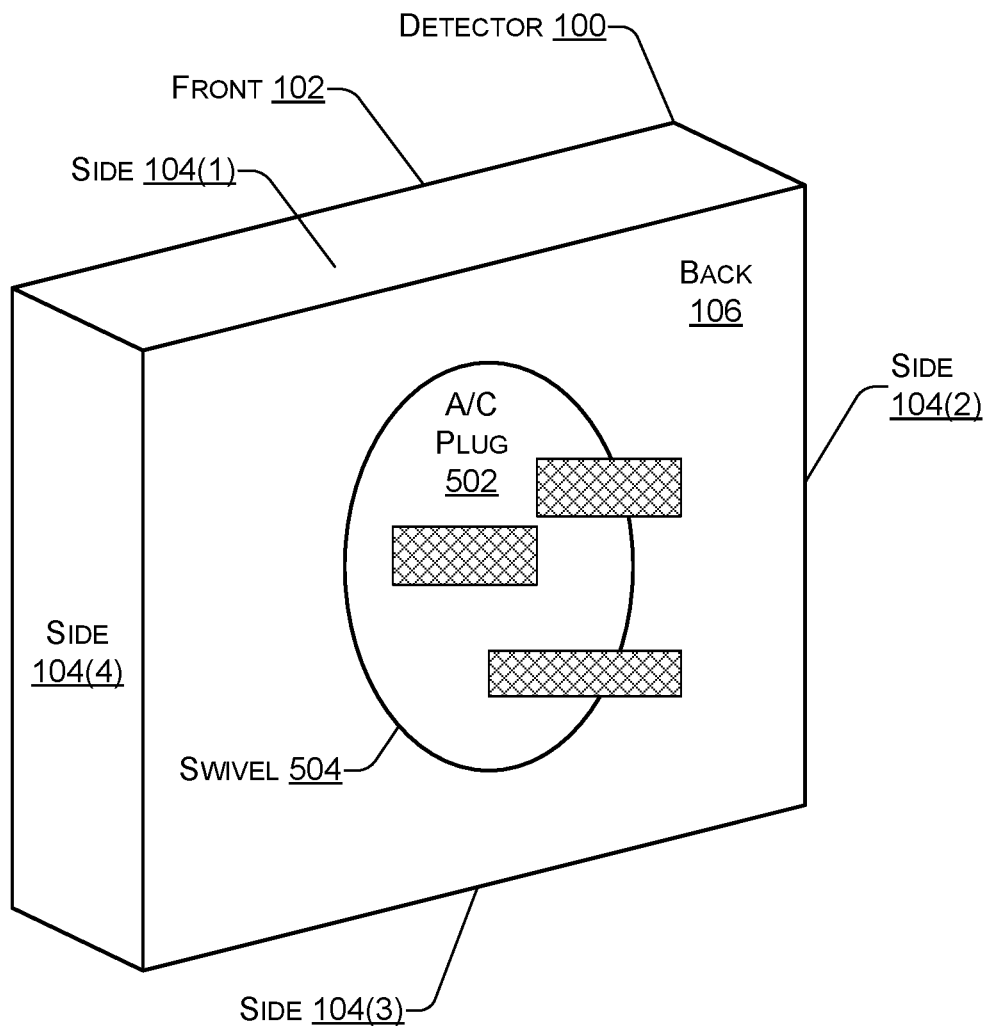
FIG. 5 is a block diagram illustrating a detector that includes a swivel plug, according to some embodiments.

FIG. 5 is a block diagram illustrating a detector that includes a swivel plug, according to some embodiments. In some cases, the back 106 of the detector 100 may include an alternating current (A/C) plug 502 that may be plugged into an A/C wall outlet to obtain power. The A/C plug 502 may, in some cases, be mounted using a swivel mechanism 504. For example, if the detector 100 includes a fixed set of sensors on one of the sides 104 (e.g., as illustrated in FIG. 1), then the swivel mechanism 504 may enable the detector 100 to be swiveled to position the sensors to create a desired detection zone. For example, if the user desires that the detection zone include where the floor meets the wall, then the detector 100 may be rotated until the sensors are facing downwards (e.g., similar to the sensors 304(1) in FIG. 3). If the user desires that the detection zone include where the ceiling meets the wall, then the detector 100 may be rotated until the sensors are facing upwards (e.g., similar to the sensors 304(2) in FIG. 3). In some cases, the detector 100 may include an electrical mount (e.g., screw mount or plug mount) instead of the A/C plug 502 to enable the detector 100 to be mounted into a light socket. The detector 100 may include a pass-through light socket (e.g., on the front 102) to enable a light to be attached to and powered via the detector 100. Sensors located on the front 102, one or more of the sides 104, and the back 106 may enable a near 360 degree detection area.

Figure 6:
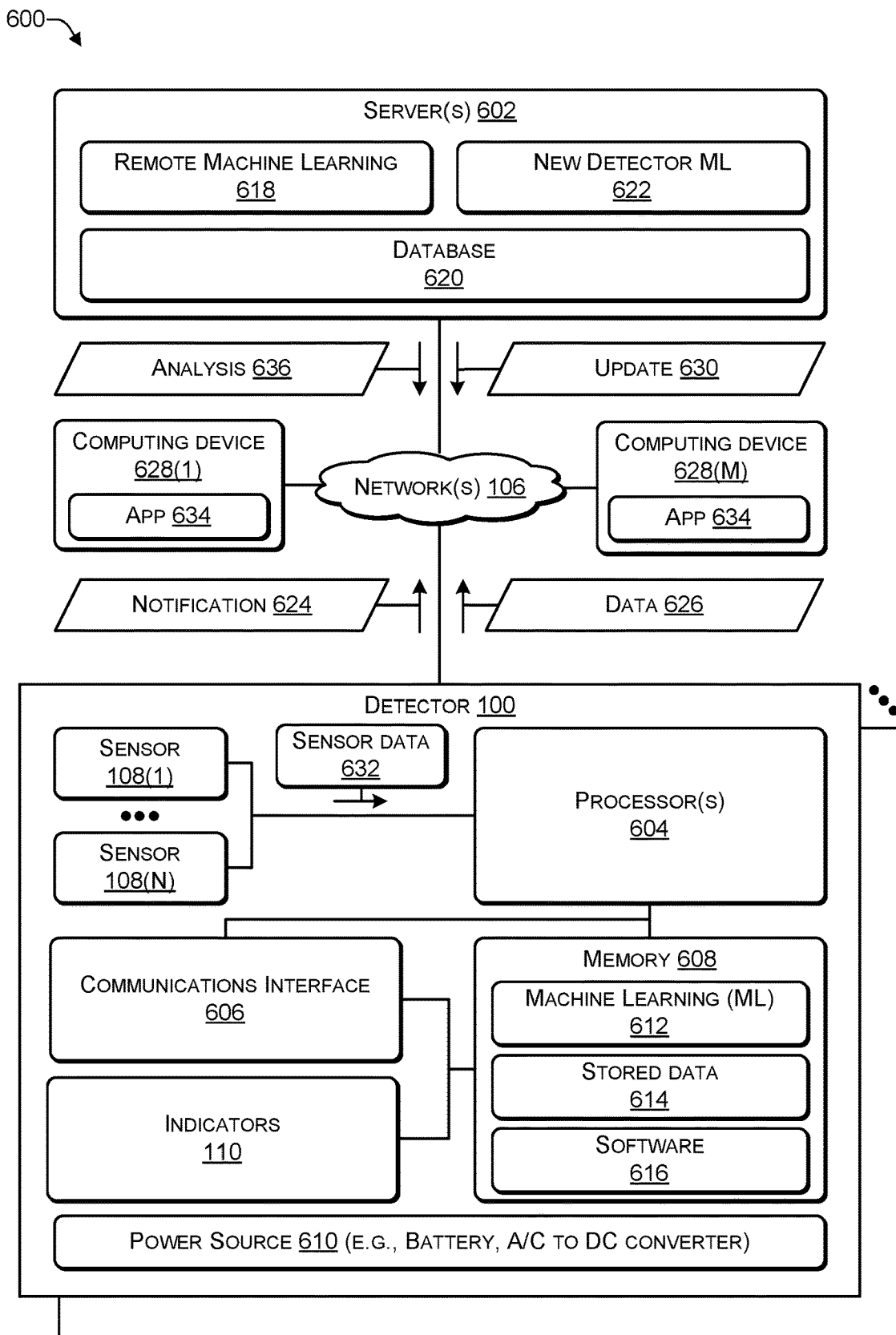
FIG. 6 is a block diagram of a system that includes multiple detectors connected to a network, according to some embodiments.

FIG. 6 is a block diagram of a system 600 that includes multiple detectors connected to a network, according to some embodiments. In the system 100, multiple detectors, such as the representative detector 100, may be coupled to one or more servers 602, and one or more computing devices 628(1) to 628(M) (M>0), via one or more networks 106. For example, the computing device 628(1) may be a user device, such as a smart phone, tablet, or voice-assistant enabled device. The computing device 628(M) may be a device associated with a pest control services company. For example, when pests are detected, the pest control services company may contact an owner or manager of a property, indicate that pests were detected, and provide an estimate to treat the property for the pests.

Figure 7:
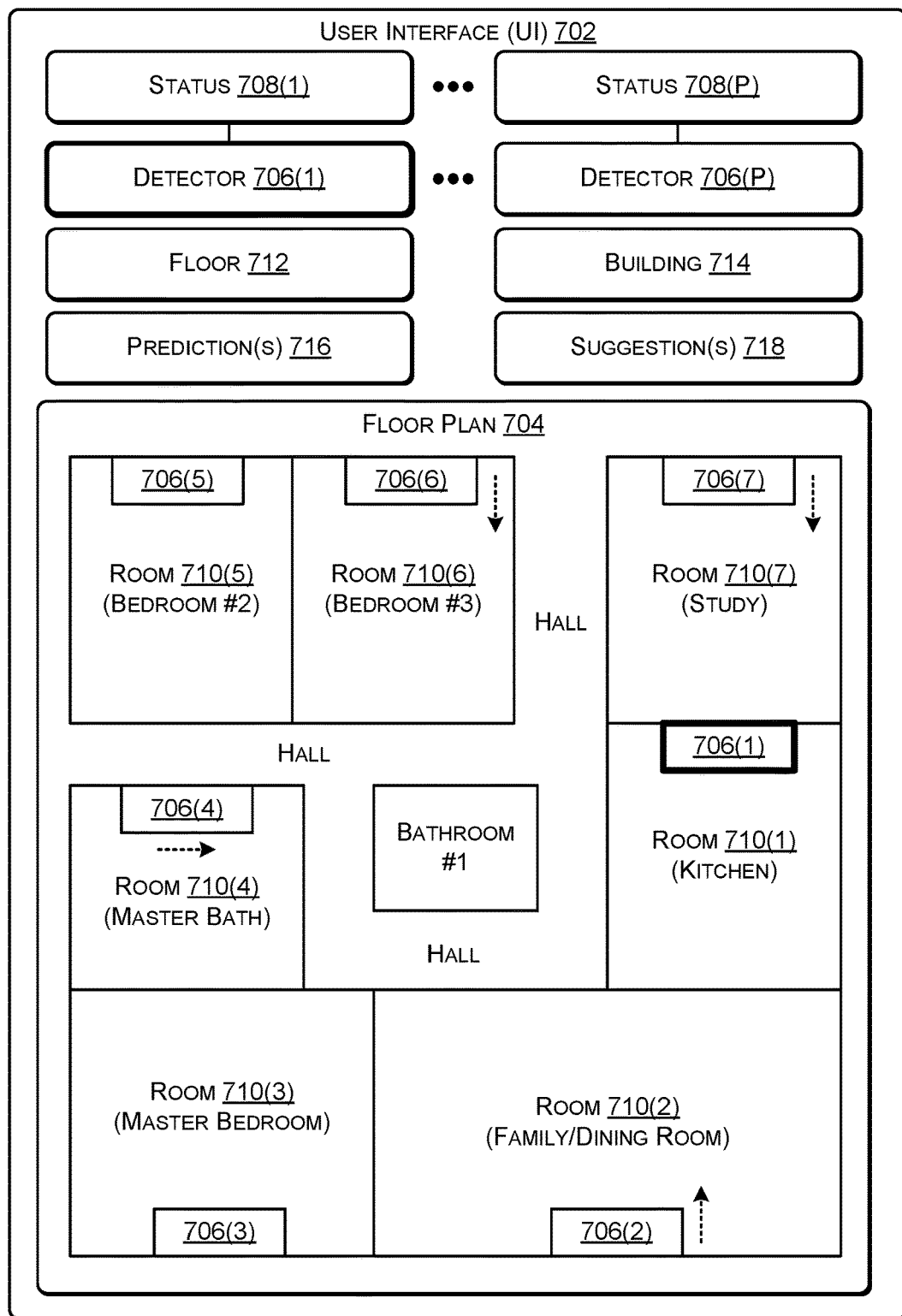
FIG. 7 is a block diagram illustrating a user interface to display locations of detectors in a floor plan, according to some embodiments.
Figure 8:
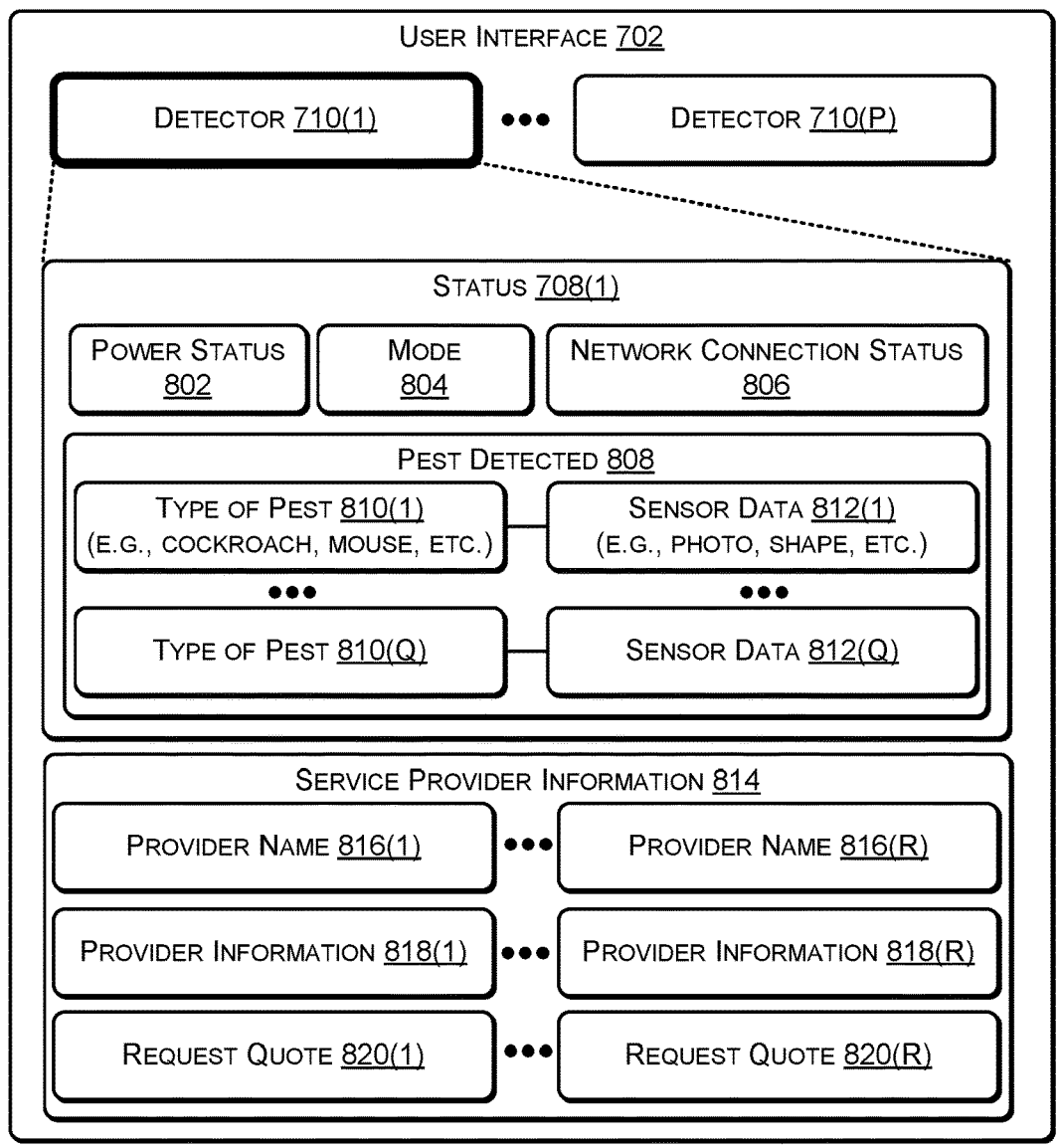
FIG. 8 is a block diagram illustrating a user interface to display data gathered by a detector, according to some embodiments.

The representative detector 100 may include the sensors 108(1) to 108(N), one or more processors 604, a communications interface 606, a memory 608, and a power source 610. The processors 604 may include custom logic devices or off-the-shelf processors that use a design by a company such as Intel®, AMD®, ARM®, or the like. The communications interface 606 may be capable of communications using one or more wired or wireless protocols, such as, for example, Ethernet®, Wi-Fi®, ZigBee®, Bluetooth®, another type of communications protocol, or any combination thereof. For example, the communications interface 606 may be capable of (1) creating a mesh network with other detectors, (2) communicating with a user device that is executing an application 634 (e.g., as illustrated in FIGS. 7 and 8) associated with the detector 100, (3) communicating with the servers 602, or any combination thereof. The memory 608 may include any type of non-transitory computer-readable storage media, including random access memory (RAM), solid state drive (SSD), removable memory (e.g., Secure Digital (SD) or micro SD), or the like. The power source 610 may be capable of converting A/C power to direct current (DC) and may enable the detector 100 to be plugged into an A/C wall outlet or use a battery source for power. In some cases, the power source 610 may include a rechargeable battery that receives a trickle charge from the power source 610. In this way, the detector 100 may remain active (e.g., by using power from the rechargeable battery) when the A/C power is temporarily unavailable (e.g., due to a brownout or other issue).

The memory 608 may be used to store software applications and data. For example, the memory 608 may store a machine learning algorithm (ML) 612 that has been trained to recognize shapes, sounds, or other sensor data associated with a particular set of pests. For example, if the detector 100 is intended for indoor use, the ML 612 may be trained to recognize indoor pests (e.g., ants, cockroaches, silverfish, and the like) associated with a particular geographic region. If the detector 100 is intended for outdoor use, the ML 612 may be trained to recognize outdoor pests (e.g., wasps, snakes, racoons, and the like) associated with a particular geographic region. In some cases, the manufacturer of the detector 100 may charge a fee to download updated machine learning algorithm. For example, if a user moves from one geographic region to another, the user may pay a fee and download a machine learning algorithm trained to detect pests in the new geographic region. When one of the sensors 108 (e.g., motion detector) detects a pest, additional ones of the sensors 108 may capture sensor data 632 (e.g., image data, audio data, and the like) associated with the pest. The ML 612 may analyze the sensor data 632 to determine a type of the pest. For example, the ML 612 may identify a digital image in the sensor data 632 to match an image of a cockroach, a mouse, a rat, a snake, a scorpion, or another type of pest. As another example, the ML 612 may determine that audio data included in the sensor data 632 matches that of a mouse, a rat, termites, a squirrel, or another type of pest. In some cases, the software 616 may compare the sensor data 632 with the stored data 614 to determine if the currently detected pest was previously detected. In this way, the detector 100 may determine the number of a particular pest. For example, the detector 100 may determine that there are at least three different cockroaches based on the size and/or shape of each cockroach. As another example, if the same mouse goes back and forth past the detector 100 multiple times, the detector 100 may determine that there is a single mouse and not many mice.

The detector 100 may receive data (e.g., digital image files, audio files, motion data, and the like) from the sensors 108 and store the data to create stored data 614. The stored data 614 may be stored in a first in first out (FIFO) circular buffer, with older data being overwritten by newer data. The memory 608 may store software 616. For example, the software 616 may receive ambient light data from an ALS (of the sensors 108) and determine whether to transition the detector 100 from low power mode to active mode (e.g., when the data satisfies a predetermined threshold, e.g., indicating that the detector's location is relatively dark) or from active mode to low power mode (e.g., when the data does not satisfy the predetermined threshold, e.g., indicating that the detector's location is relatively well lit). The software 616 may indicate which mode the detector 100 is currently in using one of the indicators 110 (e.g., green=active, yellow=standby). The software 616 may determine whether the detector 100 is connected to the network 106 using the communications interface 606 and display the connection status using one of the indicators 110 (e.g., green=connected, red=disconnected). The software 616 may use one of the indicators 100 to indicate whether the detector 100 is being powered by A/C power or battery power (e.g., green=A/C, yellow=battery). The software 616 may use one of the indicators 100 to indicate whether the detector 100 has detected a pest (e.g., green=no pests detected, red=pest detected).

After the detector 100 detects a pest, the software 616 may send a notification 624 to one or more of the computing devices 628 (e.g., for display in a UI of the app 634). The software 616 may send data 626, such as sensor data received from one or more of the sensors 108, to the computing devices 628. In some cases, the notification message 624 may include the sensor data 632 (e.g., the data 626). For example, the computing device 628(1) may receive the notification 624 and provide an audible and/or visual indication that a pest detection notification was received. The user may open the UI of the app 634 on the computing device 628(1). The computing device 628(1) may receive and display the data 626 (e.g., one or more digital images captured by the sensors 108). Receiving the notification 624 may cause a computing device, such as the computing device 628(1), to automatically (e.g., without human interaction) launch the app 634 and automatically display the notification 624 (and display the data 626) within a user interface (UI) of the app 634.

The detector 100 may, in response to detecting one or more conditions, send at least a portion of the stored data 614 to the server 602 as the data 626. To illustrate, the detector 100 may send the data 626 in response to detecting a pest. The detector 100 may send the data 626 in response to detecting a pest that the ML 612 is currently incapable of recognizing, causing the server 602 to identify the pest and, in some cases, send an updated ML 612. The detector 100 may send the data 626 in response to determining that a size of the stored data 614 satisfies a predetermined threshold (e.g., the stored data 614 is occupying at least Y % of the capacity of the memory 608, where 100>Y>0). The detector 100 may send the data 626 after a predetermined period of time (e.g., a day, a week, a month, or the like) has elapsed, at a time when the network 106 is relatively unused, such as, for example, 2:00 AM.

The servers 602 may be hardware servers, cloud-based servers, or a combination of both. The servers 602 may store a remote ML algorithm 618 and a database 620. The remote ML 618 may be much larger and more sophisticated and may be capable of recognizing many more pests than the ML 612 used by the detector 100. The server 602 may receive and store the data 626 in the database 620. The database 620 may store data received from multiple detectors deployed in multiple geographic regions over a long period of time. In contrast, the stored data 614 in the detector 100 may have a limited size and may store data acquired over a relatively short period of time. If the data 626 indicates that the detector 100 was unable to recognize the pest, the data 626 may be added to the database 620 and the remote ML 618 may retrain the machine learning algorithm (e.g., used by a detector) using at least a portion of the database 620 to create a new detector ML 622. The server 602 may send an update 630 that includes the new detector ML 622 to one or more detectors via the network 106. For example, if the server 602 determines that a particular pest that was relatively absent has now become prevalent in a particular geographic region, the server 602 may create and send the new detector ML 622 to detectors located in the particular geographic region. In this way, the server 602 may continually provide update the detectors 100 to detect new and evolving pests (e.g., bigger mice, smaller cockroaches). The remote ML 618 may perform an analysis 636 of the data 626 received from detectors located in a particular structure (e.g., detectors in the same house, warehouse, industrial plant, restaurant, apartment building, or the like) and provide the analysis 636 to the computing devices 628. The app 634 may display the analysis 636, including predictions pertaining to the detected pests. The sensors 108 may include a temperature sensitive sensor, such as, for example, a thermistor and a humidity sensor (e.g., using capacitive, resistive, or thermal conductivity technology). The temperature sensitive sensor may capture temperature data and the humidity sensor may capture humidity data and send the captured data to the ML 612. The remote ML 618 may be trained to consider temperature and humidity and make predictions based on the temperature data and the humidity data. For example, for detectors that are placed outside, the remote ML 618 may make predictions based on current weather conditions, including temperature, humidity, and weather forecasts e.g., "Scorpions are predicted because the temperature is greater than X degrees", "Crickets are predicted because the temperature is greater than X degrees and the humidity is less than Y", and so on. The predictions may be based on (1) previous data gathered under similar conditions (e.g., temperature X, humidity Y for Z length of time usually cause the number of cockroaches to increase significantly) and (2) data gathered from detectors located nearby (e.g., several of your neighbors have experienced an increase in ant activity in the past few days). The server 602 may aggregate data from multiple detectors deployed in multiple locations (e.g., houses or buildings) and make predictions. For example, increased activity in multiple buildings that are in close proximity to each other may cause the remote machine learning 618 to predict a large scale infestation spanning the multiple buildings.

In some cases, if there are multiple detectors deployed in a building, the detectors may create a mesh network. The server 602 may send the update 630 to one of the multiple detectors and instruct the detector that receives the update 630 to share the update 630 with the other detectors in the building, via the mesh network.

FIG. 7 is a block diagram 700 illustrating a user interface to display locations of detectors in a floor plan, according to some embodiments. A computing device, such as one of the computing devices 628 of FIG. 6, may execute an application (e.g., the app 634 of FIG. 6) provided by a manufacturer of the detector 100. The application may display a user interface (UI) 702 that includes a floor plan 704 for a property or location.

In some cases, the application 634 of FIG. 6 may send the floor plan 704 to the server 602 and the remote machine learning 618 may determine locations where multiple detectors 706(1) to 706(P) are to be placed. A homeowner may pay for a service that uses the remote machine learning 618 to determine in which locations the detectors 706 are to be placed. The server 602 may send data to one of the computing devices 628 (e.g., the homeowner's device) to enable the UI 702 to display the floor plan 704 and superimpose the locations on the floor plan 704. The homeowner may deploy the detectors 706 according to the locations specified in the floor plan 704. Alternately, a commercial pest control service that has a service agreement with an owner of the server 602 may measure the rooms in a house, create the floor plan 704, and send the floor plan to the server 602. The remote machine learning 618 may determine the locations in which the detectors 706 are to be placed and send data to one of the computing devices 628 (e.g., a device of the pest control service) to enable the UI 702 to display the floor plan 704 and superimpose the locations on the floor plan 704. An employee of the pest control service may deploy the detectors 706 based on the locations superimposed on the floor plan 704.

The UI 702 may display the detectors 706 deployed within an area displayed by the floor plan 704 and a corresponding status 708 corresponding to each of the detectors 706. The information displayed by the status 706 is described in more detail in FIG. 8. The floor plan 704 may displays one or more rooms 710(1) to 710(P) and provide an indication as to approximately where each of the detectors 706(1) to 706(P) are located. The UI 702 may provide a visual indicator identifying a detector that recently detected a pest. For example, in FIG. 7, the UI 702 visually indicates that the detector 706(1) recently detected a pest. The UI 702 may display arrows (e.g., see rooms 710(2), 710(4), 710(6), and 710(7)) indicating a direction in which pest movement has been detected by the detectors 706.

While the floor plan 704 illustrated in FIG. 7 is of a single-family home, other floor plans may also be displayed by the UI 702. For example, the UI 702 may include a floor selector 712 to enable a user to select a particular floor of multiple floors of a building (a house, apartment, or commercial building), a building selector 714 to enable a user to select a particular building of multiple buildings (e.g., a particular warehouse of multiple warehouses), and the like. In some cases, the UI 702 may enable a user to zoom in and out, e.g., zoom out to view multiple buildings having multiple floors, zoom into a particular building, a particular floor, and a particular room of the particular floor.

The UI 702 may display one or more predictions 716 (e.g., included in the analysis 636) determined by the remote ML 618. The predictions 716 may be based on correlating the individual data (e.g., the data 626 of FIG. 6) sent from individual ones of the detectors 706(1) to 706(P) to the server 104. The predictions 716 may include, for example, "Cockroaches appear to be gathering underneath the dishwasher, refrigerator, and stove in room 710(1)". The UI 702 may display one or more suggestions 718 (e.g., determined by the remote ML 618 and included in the analysis 636), such as, for example, "Consider moving detector 706(6) from room 710(6) to bathroom #1 as pest movement data indicates that pests may be moving to that area". The predictions 716 and the suggestions 718 may be determined by the remote ML 618 of FIG. 6. For a commercial pest control service, the suggestions 718 may include suggestions to re-deploy at least some of the detectors from a first house associated with a first customer to a second house associated with a second customer. For example, the detectors in the first house may determine that pest activity has decreased (e.g., pest activity rarely detected) while the detectors in the second house may determine that pest activity has increased. By selectively redeploying pest detectors that the pest control service has already acquired based on the remote machine learning algorithm, the pest control service may avoid acquiring additional pest detectors and instead redeploy pest detectors based on the amount of activity detected in each house.

FIG. 8 is a block diagram 800 illustrating a user interface to display data gathered by a detector, according to some embodiments. The UI 702 may visually display the detectors 710(1) to 710(P) and their corresponding status. The user may select a particular detector, such as the detector 710(1). In response, the UI 702 may display the correspond status, such as the status 708(1).

The status 708(1) may include a power status 802, a mode 804, a network connection status 806, and a pest detected status 808. The power status 802 may indicate whether the detector 710 is being powered by A/C power or battery power (e.g., green=A/C, yellow=battery). The mode 804 may indicate a mode (e.g., active mode or low power mode) of the detector 710 (e.g., green=active, yellow=standby). The network connection status 806 may indicate whether the detector 710 is connected to a network (e.g., green=connected, red=disconnected). The pest detected status 808 may indicate whether the detector 710 has detected a pest (e.g., green=no pests detected, red=pest detected). If at least one pest was detected, the pest detected 808 may display each type of pest 810(1) to 810(Q) (Q>0) that was detected and the associated sensor data 812(1) to 812(Q). For example, if three different sized cockroaches were detected, an image of each of the three may be displayed. As another example, if mice were detected behind a wall, an ultrasound or other type of image may be displayed and an audio recording of the noises made by the mice may be made available for playback.

When the UI 702 receives a notification and sensor data from a detector (e.g., the notification 624 and the data 626 from the detector 100), the UI 702 may visually indicate that the detector (e.g., the detector 710(1)) has detected a pest, display the type of the pest 810 and the corresponding sensor data 812.

The UI 702 may display pest control service provider information 814, such as provider names 816(1) to 816(R) (R>0) and corresponding provider information 818 (e.g., address, phone number, email address, distance from the device displaying the UI 702). The UI 702 may provide a selection to enable the user to request a quote 820 from one of the corresponding providers 816. For example, selecting the request quote 820(1) selector may cause the UI 702 to initiate a voice call (or send an email) to a phone number (or email address) associated with the provider name 816(1) to request a quote.

Figure 9:
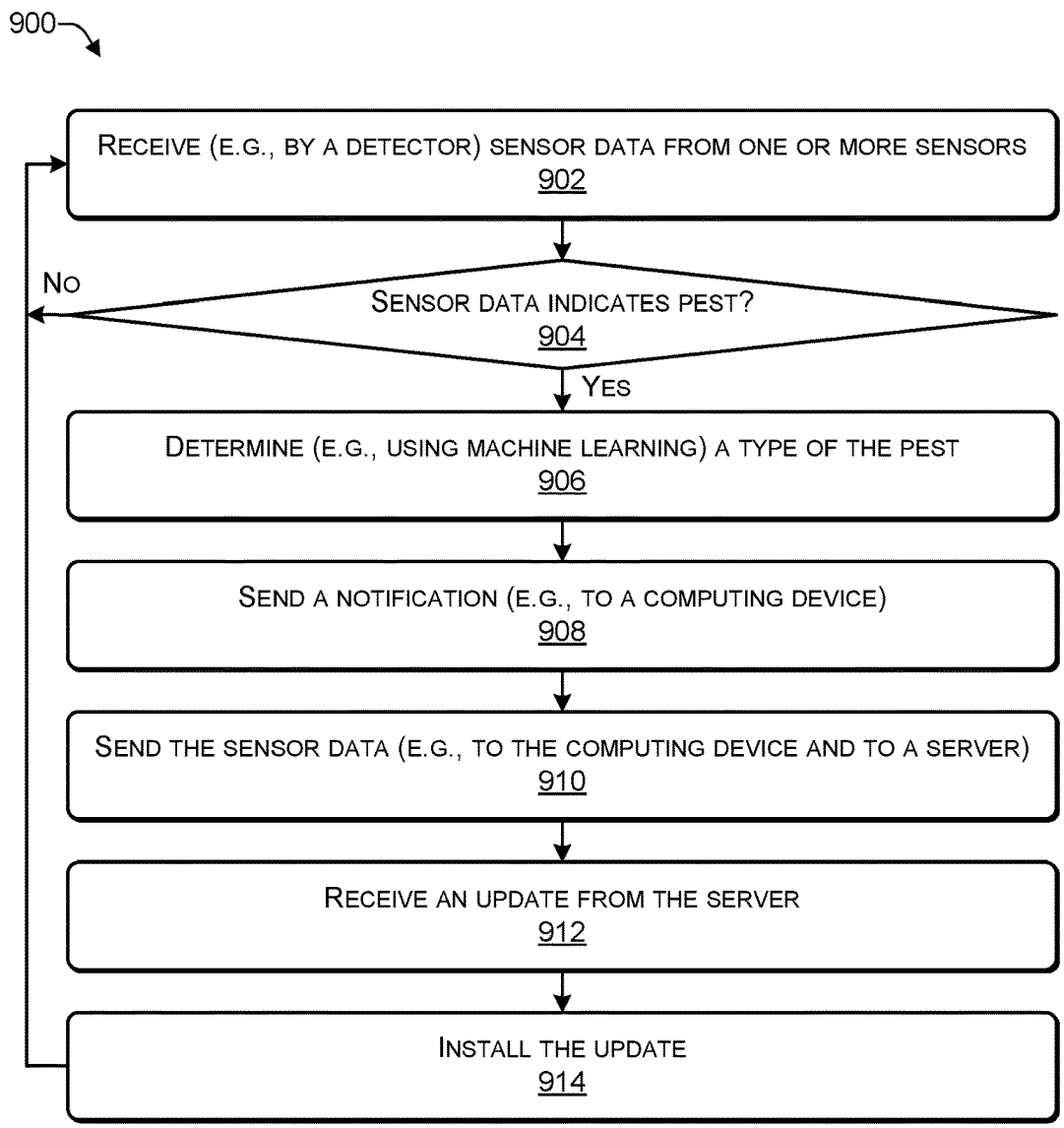
FIG. 9 is a flowchart of a process that includes identifying a type of pest using sensor data, according to some embodiments.
Figure 10:
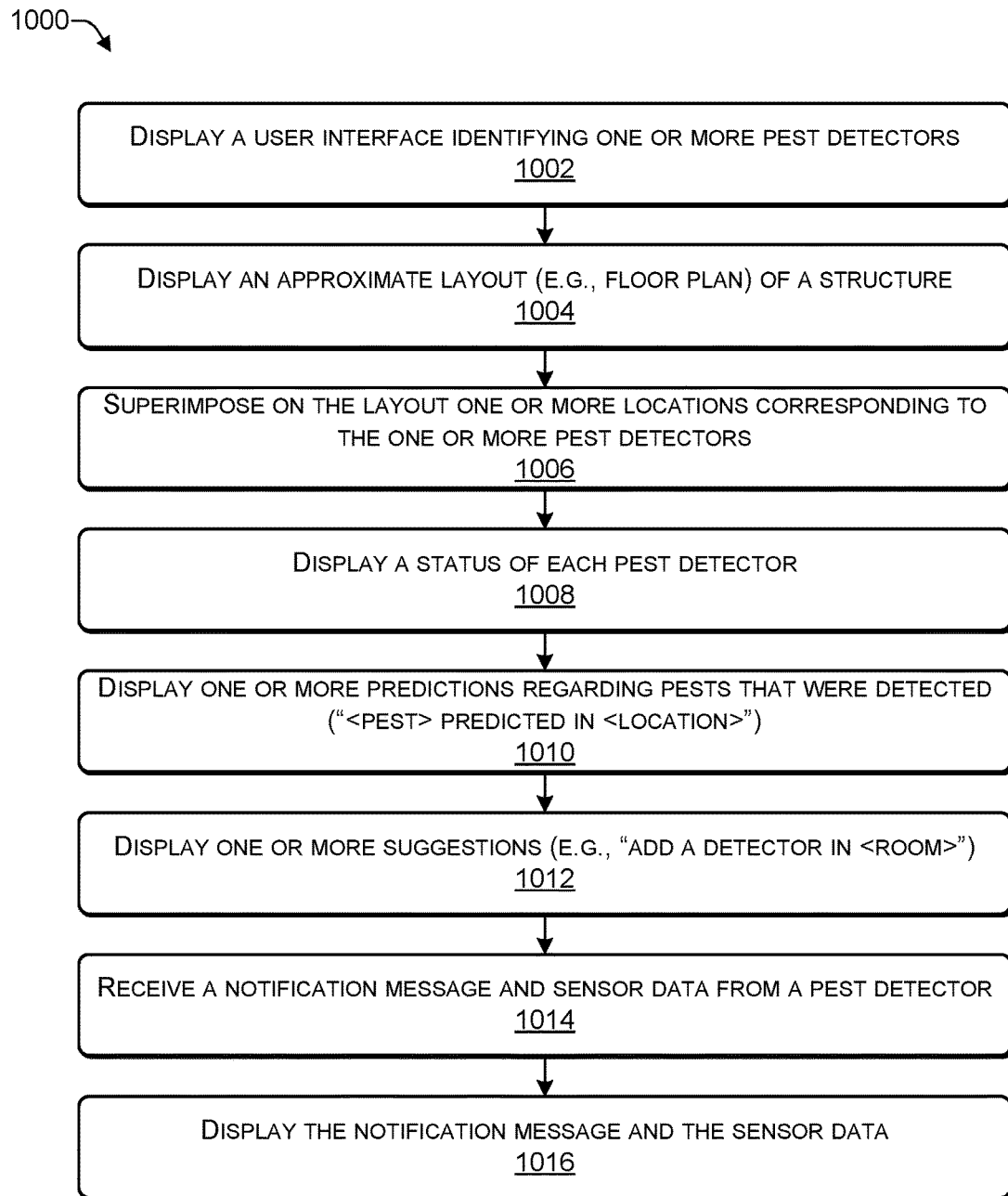
FIG. 10 is a flowchart of a process that includes displaying one or more predictions regarding pests, according to some embodiments.

In the flow diagrams of FIGS. 9 and 10, each block represents one or more operations that can be implemented in hardware, software, or a combination thereof. In the context of software, the blocks represent computer-executable instructions that, when executed by one or more processors, cause the processors to perform the recited operations. Generally, computer-executable instructions include routines, programs, objects, modules, components, data structures, and the like that perform particular functions or implement particular abstract data types. The order in which the blocks are described is not intended to be construed as a limitation, and any number of the described operations can be combined in any order and/or in parallel to implement the processes. For discussion purposes, the processes 900 and 1000 are described with reference to FIGS. 1, 2, 3, 4, 5, 6, 7, and 8 as described above, although other models, frameworks, systems and environments may be used to implement these processes.

FIG. 9 is a flowchart of a process 900 that includes identifying a type of pest using sensor data, according to some embodiments. The process 900 may be performed by one or more components of a detector, such as the detector 100 of FIGS. 1-6.

At 902, sensor data may be received from one or more sensors. At 904, a determination may be made whether the sensor data indicates a presence of a pest. If a determination is made, at 904, that "no" the sensor data does not indicate the presence of a pest, then the process may proceed back to 902. If a determination is made, at 904, that "yes" the sensor data indicates the presence of a pest, then the process may proceed to 906, where a type of the pest may be determined. For example, in FIG. 6, the sensors 108 may detect the presence of a pest and capture the sensor data 632 associated with the pest. The sensors 108 may send the sensor data 632 to the processors 604. The processors 604 may determine whether the sensor data 632 indicates the presence of a pest. For example, if the sensor data 632 indicates the presence of a human or a pet (e.g., cat or dog), then the sensor data 632 may be discarded and the processors 604 may wait to receive additional sensor data. If the sensor data 632 indicates the presence of a pest, then the process may determine, using the ML 612, a type of the pest. For example, the ML 612 may be trained to recognize (e.g., classify or predict) one of multiple types of pests based on the sensor data 632.

At 908, a notification may be sent (e.g., to a computing device). For example, in FIG. 6, the detector 100 may send the notification 624 indicating that a particular type of pest was detected to one or more of the computing devices 628. The UI 702 may provide an audible (and/or visual indication) that the notification 624 was received.

At 910, the sensor data may be sent (e.g., to the computing device and to a server). For example, in FIG. 6, the detector 100 may send the data 626 (e.g., including the sensor data 632) to one or more of the computing devices 628, to the server 602, or any combination thereof. For example, the UI 702 may display the data 626. The server 602 may store the data 626 in the database 620. In some cases, the server 602 may analyze the data 626 to determine additional information, such as how many humans live in a house, how many adults live in the house, how many children live in the house, how many pets live in the house, how much time the humans spend in each room that has a detector, and the like. Such an analysis may be used to provide targeted advertising to the occupants of the house.

At 912, an update may be received from the server. At 914, the update may be installed. For example, if the detector 100 could not identify a particular pest, the detector 100 may send the sensor data 632 to the server 602. The remote ML 618 may identify the pest, retrain the ML algorithm using the database 620 to create the new detector ML 622, and send the update 630 that includes the new detector ML 622 to one or more detectors, including the detector 100. The detector 100 may install the update 630 to enable the detector 100 to detect the previously unidentifiable pest.

FIG. 10 is a flowchart of a process 1000 that includes displaying one or more predictions regarding pests, according to some embodiments. The process 1000 may be performed by an application executing on a computing device, such as the app 634 executing on the computing devices 628 of FIG. 6.

At 1002, a user interface (UI) identifying one or more pest detectors may be displayed. At 1004, the UI may display an approximate layout (e.g., floor plan) of a structure. At 1006, the UI may display locations of the one or more pest detectors superimposed on the layout of the structure. At 1008, the UI may display a status of each pest detector. For example, in FIG. 7, the UI 702 may display the detectors 706 and a corresponding status 708. The UI 702 may display approximate locations of each of the detectors 706 superimposed on the floor plan 704. The UI 702 may visually indicate which of the detectors 706, such as the detector 706(1), has detected a pest.

At 1010, the UI may display one or more predictions associated with the pests that were detected. At 1012, the UI may display one or more suggestions. For example, in FIG. 6, the remote ML 618 may analyze at least a portion of the data stored in the database 620 to create the analysis 636. The server 602 may send the analysis 636 to the computing devices 628 for display by the app 634. The analysis 636 may include the predictions 716 and the suggestions 718 of FIG. 7. The predictions 716 may include predictions on particular location(s) where pests are predicted to be nesting based on pest movement.

At 1014, the UI may receive a notification message and sensor data from a pest detector (of the one or more pest detectors). At 106, the UI may display the notification message and the sensor data. For example, in FIG. 6, the detector 100 may send the notification 624 and the data 626 (e.g., including the sensor data 632) to one or more of the computing devices 628. The app 634 may display the notification 624 and the data 626 in the UI 702 of FIGS. 7 and 8.

Figure 11:
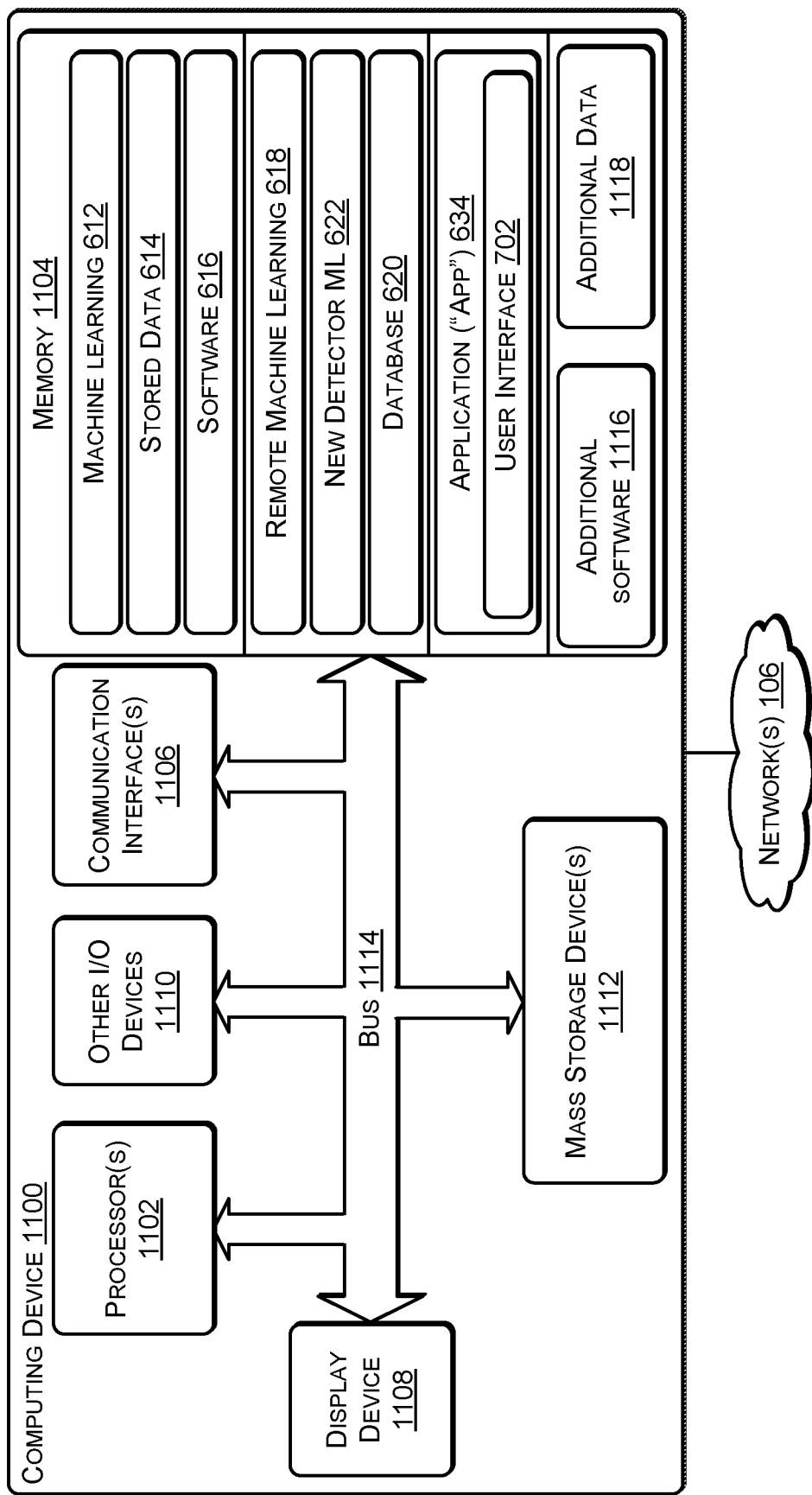
FIG. 11 illustrates an example configuration of a computing device that can be used to implement the systems and techniques described herein.

FIG. 11 illustrates an example configuration of the computing device 1100 that can be used to implement the systems and techniques described herein, including the detector 100, the server 602, and one or more of the computing devices 628. The computing device 1100 may include one or more processors 1102, a memory 1104, communication interfaces 1106, a display device 1108, other input/output (I/O) devices 1110, and one or more mass storage devices 1112, configured to communicate with each other, such as via system buses 1114 or other suitable connection. The system buses 1114 may include multiple buses, such as memory device buses, storage device buses, power buses, video signal buses, and the like. A single bus is illustrated in FIG. 11 purely for ease of understanding.

The processors 1102 are one or more hardware devices that may include a single processing unit or a number of processing units, all of which may include single or multiple computing units or multiple cores. The processors 1102 may be implemented as one or more microprocessors, microcomputers, microcontrollers, digital signal processors, central processing units, graphics processing units, state machines, logic circuitries, and/or any devices that manipulate signals based on operational instructions. Among other capabilities, the processor 1102 may be configured to fetch and execute computer-readable instructions stored in the memory 1104, mass storage devices 1112, or other computer-readable media.

Memory 1104 and mass storage devices 1112 are examples of computer storage media (e.g., memory storage devices) for storing instructions that can be executed by the processor 1102 to perform the various functions described herein. For example, memory 1104 may include both volatile memory and non-volatile memory (e.g., RAM, ROM, or the like) devices. Further, mass storage devices 1112 may include hard disk drives, solid-state drives, removable media, including external and removable drives, memory cards, flash memory, floppy disks, optical disks (e.g., CD, DVD), a storage array, a network attached storage, a storage area network, or the like. Both memory 1104 and mass storage devices 1112 may be collectively referred to as memory or computer storage media herein, and may be a media capable of storing computer-readable, processor-executable program instructions as computer program code that can be executed by the processor 1102 as a particular machine configured for carrying out the operations and functions described in the implementations herein.

The computing device 1100 may also include one or more communication interfaces 1106 for exchanging data via the network 106. The communication interfaces 1106 can facilitate communications within a wide variety of networks and protocol types, including wired networks (e.g., Ethernet, DOCSIS, DSL, Fiber, USB etc.) and wireless networks (e.g., WLAN, GSM, CDMA, 802.11, Bluetooth, Wireless USB, cellular, satellite, etc.), the Internet and the like. Communication interfaces 1106 can also provide communication with external storage (not shown), such as in a storage array, network attached storage, storage area network, or the like. A display device 1108, such as a monitor may be included in some implementations for displaying information and images to users. Other I/O devices 1110 may be devices that receive various inputs from a user and provide various outputs to the user, and may include a keyboard, a remote controller, a mouse, a printer, audio input/output devices, and so forth.

The computer storage media, such as memory 1104 and mass storage devices 1112, may be used to store software and data. For example, when the computing device 1100 is used to implement the detector 100, the memory 1104 may be used to store the machine learning 612, the stored data 614, and the software 616. When the computing device 1100 is used to implement the server 602, the memory 1104 may be used to store the remote machine learning 618, the new detector ML 622, and the database 620. When the computing device 1100 is used to implement one of the computing devices 628, the memory 1104 may be used to store the app 634 that is used to display the UI 702. In all three of the previous examples, the memory 1104 may be used to store additional software 1116 and additional data 1118. The additional software 1116 may include vision processing units (VPUs) to analyze image data captured by sensors and neural network processing. For example, neural networks may be used to analyze digital images and learn to identify images that include pests by analyzing example images that have been manually labeled as "<pest>" or "not a <pest>" and using the results to identify pests in other images. The neural networks automatically generate identifying characteristics from processing the learning material.

The example systems and computing devices described herein are merely examples suitable for some implementations and are not intended to suggest any limitation as to the scope of use or functionality of the environments, architectures and frameworks that can implement the processes, components and features described herein. Thus, implementations herein are operational with numerous environments or architectures, and may be implemented in general purpose and special-purpose computing systems, or other devices having processing capability. Generally, any of the functions described with reference to the figures can be implemented using software, hardware (e.g., fixed logic circuitry) or a combination of these implementations. The term "module," "mechanism" or "component" as used herein generally represents software, hardware, or a combination of software and hardware that can be configured to implement prescribed functions. For instance, in the case of a software implementation, the term "module," "mechanism" or "component" can represent program code (and/or declarative-type instructions) that performs specified tasks or operations when executed on a processing device or devices (e.g., CPUs or processors). The program code can be stored in one or more computer-readable memory devices or other computer storage devices. Thus, the processes, components and modules described herein may be implemented by a computer program product.

Furthermore, this disclosure provides various example implementations, as described and as illustrated in the drawings. However, this disclosure is not limited to the implementations described and illustrated herein, but can extend to other implementations, as would be known or as would become known to those skilled in the art. Reference in the specification to "one implementation," "this implementation," "these implementations" or "some implementations" means that a particular feature, structure, or characteristic described is included in at least one implementation, and the appearances of these phrases in various places in the specification are not necessarily all referring to the same implementation.

Although the present invention has been described in connection with several embodiments, the invention is not intended to be limited to the specific forms set forth herein. On the contrary, it is intended to cover such alternatives, modifications, and equivalents as can be reasonably included within the scope of the invention as defined by the appended claims.

What is claimed is:

1. A detector comprising:
   one or more sensors;
   one or more external indicators;
   one or more processors; and
   one or more non-transitory computer-readable media to store instructions executable by the one or more processors to perform operations comprising:
      receiving sensor data from a first sensor of the one or more sensors;
      determining, by a machine learning algorithm, that the sensor data indicates a presence of a pest;
      sending a notification message to a computing device, the notification message including at least a portion of the sensor data; and
      visually indicating, using a pest detected indicator of the one or more external indicators that the pest was detected;
   a sensor plugin comprising:
      an additional sensor; and
      a plug to mate with a receptacle in a housing of the detector, the plug to provide:
         a mechanical linkage between the sensor plugin and the detector; and
         an electrical linkage to carry additional sensor data from the additional sensor to the one or more processors in the detector.

2. The detector of claim 1, the operations further comprising:
   detecting, by a motion sensor, movement associated with the pest; and
   capturing, by an imaging sensor of the detector, one or more digital images of the pest, wherein:
      the first sensor comprises the motion sensor and the additional sensor comprises the imaging sensor; or
      the first sensor comprises the imaging sensor and the additional sensor comprises the motion sensor.

3. The detector of claim 1, the operations further comprising:
   detecting, using a wireless networking protocol, a presence of one or more additional detectors; and
   creating a mesh network with the one or more additional detectors, wherein the detector uses the mesh network to communicate with at least one of a computing device or a server that is wirelessly connected to the detector.

4. The detector of claim 1, the operations further comprising:
   receiving ambient light data from an ambient light sensor of the detector;
   determining that the ambient light data satisfies a predetermined threshold; and
   transitioning the detector from an active mode to a low-power mode.

5. The detector of claim 1, wherein indicating that the pest was detected comprises at least one of:
   visually indicating, using an external indicator light of the detector, that the pest was detected; or
   causing an indicator to be displayed on a software application executing on a computing device that is wirelessly connected to the detector, wherein the computing device comprises one of a smartphone, a tablet, or a virtual assistant enabled device.

6. The detector of claim 1, wherein the one or more external indicators comprise one or more of:
   a power indicator to indicate that the detector is either powered on or powered off;
   a mode indicator to indicate that the detector is either in a low power mode or in a pest detection mode;
   a network connection status indicator to indicate that the detector is either connected to a wireless network or not connected to the wireless network; and a pest detected status indicator to indicate that the detector has detected the pest or has not detected the pest.

7. The detector of claim 1, the operations further comprising:
comparing the sensor data with previously stored sensor data; and
determining a number of pests detected by the detector.

8. A detector comprising:
one or more sensors;
a sensor plugin comprising:
a plugin housing that includes an additional sensor of the one or more sensors;
a plug to mate with a receptacle in a housing of the detector; and
a telescoping extender that is extendable to position the additional sensor at a particular distance from the detector;
one or more external indicators;
one or more processors; and
one or more non-transitory computer readable media storing instructions executable by the one or more processors to perform operations comprising:
receiving sensor data from the one or more sensors;
determining, by a machine learning algorithm, that the sensor data indicates a presence of a pest;
sending a notification message to a computing device, the notification message including at least a portion of the sensor data; and
visually indicating, using a pest indicator of the one or more external indicators, that the pest was detected.

9. The detector of claim 8, wherein:
the sensor plugin rotates at least 180 degrees to position the additional sensor to detect pests in a pest detection zone that is about 180 degrees relative to a front surface of the detector.

10. The detector of claim 9, wherein:
a second sensor of the one or more sensors creates a second pest detection zone that is about 180 degrees relative to a rear surface of the detector;
wherein the additional sensor and the second sensor provide about 360 degrees of pest detection.

11. The detector of claim 8, wherein:
the additional sensor is positioned to detect pests where a floor meets a wall or where the wall meets a ceiling.

12. The detector of claim 11, wherein the additional sensor is backward facing to detect pest movement within a wall.

13. The detector of claim 8, wherein the one or more sensors comprise at least one of:
a motion sensor, an imaging sensor, a microphone, a structured light sensor, an ultrasound sensor, a temperature sensor, an ultrasonic sensor, a capacitive sensor, or a micropower impulse radar sensor.

14. A detector comprising:
one or more processors; and
one or more non-transitory computer readable media to store instructions executable by the one or more processors to perform operations comprising:
receiving sensor data from one or more sensors;
determining, by a machine learning algorithm, that the sensor data indicates a presence of a pest;
sending a notification message to a computing device, the notification message including at least a portion of the sensor data;
visually indicating, using an external indicator light of the detector, that the pest was detected;
receiving second sensor data from the one or more sensors;
determining that the machine learning algorithm does not recognize a second pest in the second sensor data; and
sending a message to a server indicating that the machine learning algorithm does not recognize the second pest, the message including the second sensor data.

15. The detector of claim 14, wherein the operations further comprise:
receiving an update to the machine learning algorithm from a server;
installing the update to create an updated machine learning algorithm; and
determining, by the updated machine learning algorithm, that the second sensor data indicates the presence of the second pest.

16. The detector of claim 15, wherein:
the updated machine learning algorithm is trained to detect pests in a geographic area in which the detector is located.

17. The detector of claim 14, wherein the sensor data comprises at least one of:
a set of one or more digital images; or
a digital audio recording.

18. The detector of claim 14, wherein the operations further comprise:
detecting, by a motion sensor of the detector, movement associated with the pest; and
in response to detecting the movement, capturing, by an imaging sensor of the detector, one or more digital images of the pest.

19. The detector of claim 14, the operations further comprising:
receiving ambient light data from an ambient light sensor of the detector;
determining that the ambient light data does not satisfies a predetermined threshold; and
transitioning the detector from an active mode to a low-power mode.

20. The detector of claim 14, wherein the one or more sensors comprise at least one of:
a motion sensor, an imaging sensor, a microphone, a structured light sensor, an ultrasound sensor, a temperature sensor, an ultrasonic sensor, a capacitive sensor, or a micropower impulse radar sensor.

* * * * *